United States Patent [19]
Walsh

[11] Patent Number: 5,563,845
[45] Date of Patent: Oct. 8, 1996

[54] SYSTEM AND METHOD FOR ACOUSTICALLY IMAGING AN UNDERGROUND TANK

[75] Inventor: Kenneth M. Walsh, Middletown, R.I.

[73] Assignee: The United States of America as represented by the Secretary of the Navy, Washington, D.C.

[21] Appl. No.: 556,301

[22] Filed: Nov. 7, 1995

[51] Int. Cl.⁶ .................................................. G03B 42/06
[52] U.S. Cl. ................................................ 367/7; 367/908
[58] Field of Search .................................. 367/7, 908, 99; 181/124; 340/621; 73/290 V

[56] References Cited

U.S. PATENT DOCUMENTS

| | | | |
|---|---|---|---|
| 5,127,266 | 7/1992 | Maresca, Jr. et al. | 367/908 |
| 5,228,339 | 7/1993 | Maresca, Jr. et al. | 367/908 |
| 5,263,371 | 11/1993 | Maresca, Jr. et al. | 367/99 |

*Primary Examiner*—Daniel T. Pihulic
*Attorney, Agent, or Firm*—Michael J. McGowan; James M. Kasischke; Prithvi C. Lall

[57] ABSTRACT

A vertical acoustic array system and method for acoustically imaging the contents of a partially or completely buried tank which can contain radioactive solids and may not be entirely filled. The transducer array is placed proximate a side of a tank in a vessel such as a tube filled with water. Dirt or other filler material located between the tube and the tank is saturated with water, allowing the acoustic signal to propagate through the side of the tank and into the tank. The vertical array consists of one or more transmitting units and receiving units set in a vertical array including dipole receiving elements which allow horizontal directionality. The signals are analyzed by a field unit which includes a portable self-powered trailer providing signal transmitting and analysis devices. The field unit can transmit signals to a second unit which provides further signal analysis.

17 Claims, 3 Drawing Sheets

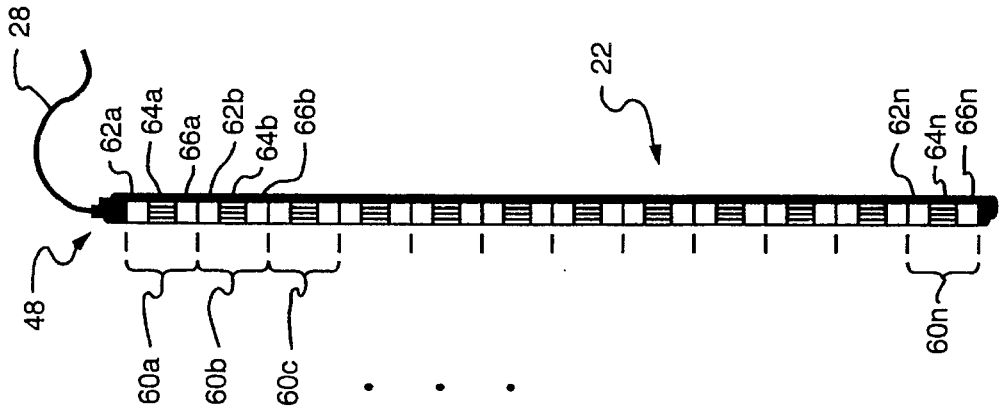

SYSTEM AND METHOD FOR ACOUSTICALLY IMAGING AN UNDERGROUND TANK

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

This invention relates to an acoustic imaging system and more particularly, to a system and method for acoustic imaging of the contents of an underground tank.

(2) Brief Description of the Prior Art

Monitoring the contents of underground tanks such as radioactive waste tanks, has always been difficult and problematic. Such tanks are buried underground allowing the soil to provide extra shielding from radiation. Such tanks also tend to be at remote sites for the obvious purpose of minimizing human exposure to radioactivity.

Radioactive waste may contain both radioactive and inert material. Monitoring such waste tanks typically includes measuring the internal distribution of radioactive material or sediment as compared to inert material. Prior art methods include removing and analyzing a core sample of material obtained from the tank. The core sample is dangerous to manipulate, requiring special handling and analysis. Because each sample only represents a single point in time, samples must be continually taken to track the distribution and breakdown of radioactive materials over time.

Sound waves can be used to analyze the contents of an area using acoustic imaging. One technique is to situate a transducer at the top of such a tank and transmit acoustic waves into the material, and analyze the reflected wave. This technique can be used to obtain an image of the contents of the tank including the level of sediment in the tank.

Placing a transducer on top of a tank, however, will not work in most situations. Because of gravity, material in tanks tends to settle and stratify into horizontal layers. If some layers contain gas bubbles or are otherwise impervious to acoustic wave propagation, it is not feasible to propagate sound perpendicularly through these layers. Accordingly, what is needed is a system and method for propagating sound horizontally through the side of an underground tank.

One prior art method involves providing an array of vertically arranged transducers next to the tank. Situating such a vertical array to the side of a tank is also problematic, particularly for previously installed tanks. The transducer array must be in good acoustic contact with the contents of the underground tank. Either the transducer array must be installed inside the tank, which requires an opening and the danger of breaching tank integrity, or the transducer array must be installed against the side of the tank. Drilling into the soil next to the side of the tank is extremely dangerous, not only for the danger of breaching the radioactive containment tank, but also due to the possibility of radiation exposure to persons working close to the tank.

Accordingly, what is needed is a system and method for acoustically imaging the contents of a remote tank, which can provide real time data, and poses no danger of radioactive waste tank breach.

SUMMARY OF THE INVENTION

This invention provides a system and method for imaging the contents of a tank which includes a vertically arranged transducer array. The transducer array includes at least one transducer unit. This at least one transducer unit has at least a first acoustic signal transmitting member which produces at least one acoustic signal. The at least one transducer unit includes at least one acoustic signal receiving member which is typically disposed generally vertically below the at least one acoustic transmitting member. The acoustic receiving member receives at least the one acoustic signal from the acoustic transmitting member.

The transducer array is placed proximate and in acoustic contact with liquid saturated filler material proximate at least one side of the tank whose contents is being imaged. The liquid saturated filler material allows the acoustic signal to reach and penetrate the tank. A transducer unit or array controller is electrically coupled to the transducer array, for controlling and producing the acoustic signals and for analyzing received or reflected acoustic signals.

The transducer array can also include at least a second acoustic transducer unit including a second transmitting member disposed generally vertically below the at least one acoustic receiving member. This second acoustic transmitting member produces at least a second acoustic signal, wherein the at least one acoustic receiving member receives the first and second reflected acoustic signals. The transducer array can include a plurality of these transducer units, commonly to a length or depth of 24 feet.

The acoustic receiving member in the preferred embodiment comprises a dipole element for allowing directionality both in the transmitted and received acoustic signals. The transducer units and transducer array are preferably ceramic transducers.

This transducer array allows a tank containing solids to be examined safely and without contact with the tank contacts. The transducer array is preferably suspended in a water filled vertical pipe proximate an exterior side of the tank.

A field support unit, which is often contained in a portable trailer is connected via a cable to the transducer elements. The trailer can include transducer array controllers, signal analysis equipment and a portable power supply. The signals produced include Gaussian-enveloped frequency modulated slide pulses, which provide sharp signal directionality for obtaining acoustic image pictures, and low frequency long pulses, which can be used to produce standing waves within the tank to detect resonant properties of various materials in response to the acoustic signals within the tank.

BRIEF DESCRIPTION OF THE DRAWINGS

FIG. 2 is a schematic diagram of a transducer array element, according to the present invention;

DETAILED DESCRIPTION OF THE INVENTION

Figure 1:
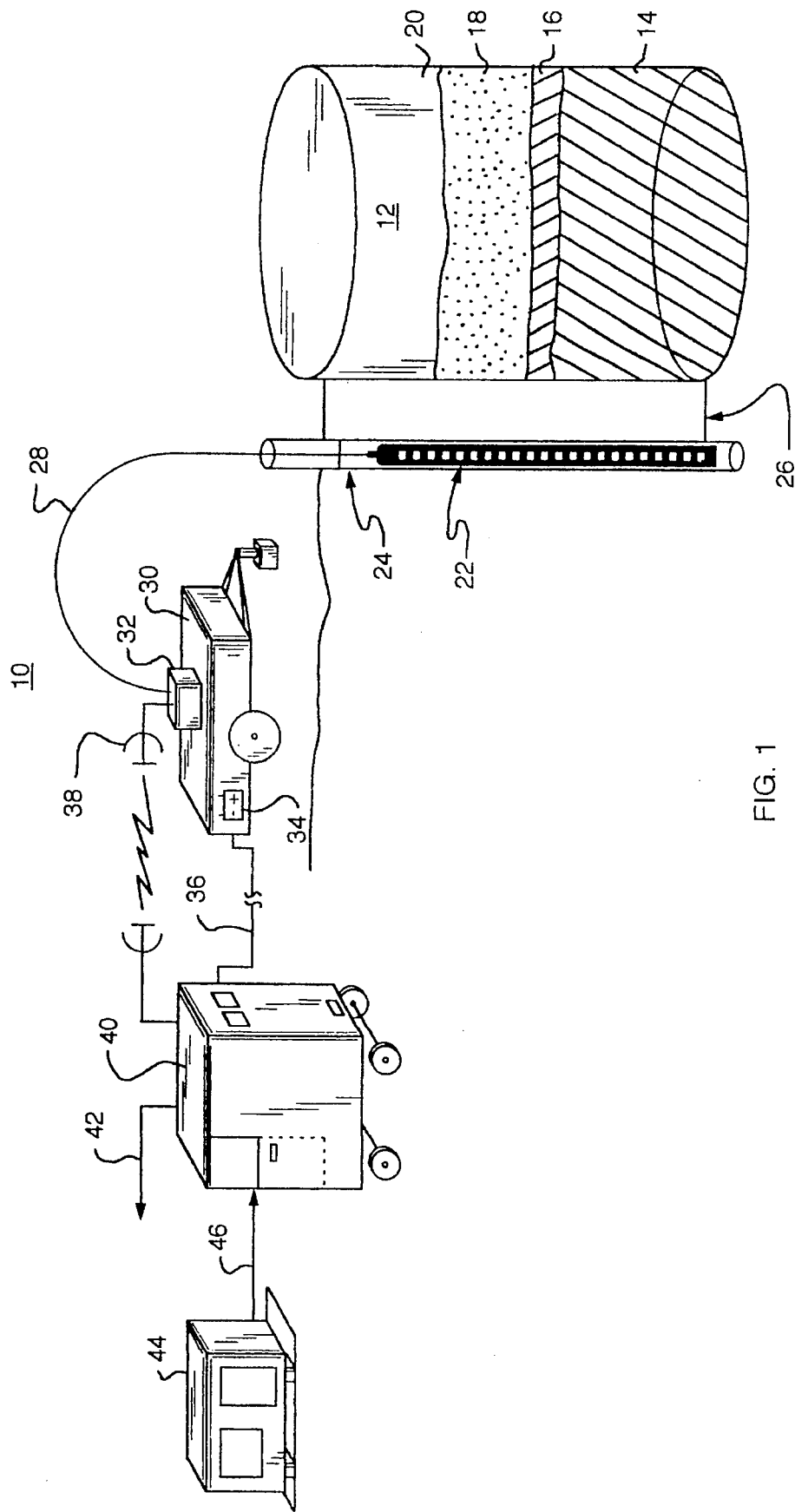
FIG. 1 is a schematic diagram of a system for acoustically imaging the contents of a tank, according to the present invention.

An acoustic tank imaging system 10 according to one embodiment the present invention is installed near a semiburied or buried tank 12. Tank 12 holds wastes, which can be radioactive, for temporary or permanent storage. The contents of tank 12 tend to stratify into layers of material 14, 16, 18, which can contain radioactive particles. Above the layers is open space 20, which prevents an acoustic imager from working on top of tank 12.

A vertically arranged transducer array 22 is lowered into a pipe 24 which is placed proximate a side of tank 12. Pipe 24 should continue to the same depth as tank 12 to allow transducer array 22 to image every level of tank 12. Pipe 24 is then filled with water or other liquid, allowing transducer array 22 to transmit and receive acoustic waves through the water medium and through the side of pipe 24. Filler material 26, which includes soil or dirt surrounding the tank, is saturated with water. This allows the filler material 26 to propagate the sound waves from transducer array 22 to the side of tank 12 and into the tank.

Transducer array 22 is connected by cable 28 to a portable field unit 30. Cable 28 comprises a wire harness, containing enough signal paths for providing signal carrying capabilities for all the transducer elements in transducer array 22. Portable field unit 30 contains signal analysis equipment 32, which can include acoustic receivers, digital transmitters, transmit/receive switches, A/D converters, multiplexers, preamplifiers, signal conditioners, drivers and any telemetry systems that interface with the acoustic transducer array 22 and provide formatted data for analysis at other sites. Portable field unit 30 also contains its own power supply 34, which comprises batteries or a portable generator. In the preferred embodiment, lead acid batteries line the bottom of portable field unit 30 shielding the test equipment 32 from radiation from tank 12. One set of batteries provides the surge current for the acoustic transmitter, and a separate set supplies the acoustic receiver and telemetry power.

Portable field unit 30 can also contain microwave transmitters 38, for transmitting data to a remote receiving unit 40. Portable field unit 30 can also have other signal paths 36, which includes telephone line hook ups, transmission cables, such as SNA or ethernet, token ring, or fiber optic networks (FDDI). Portable field unit 30 can use this data path as well as transmitter 38 both to send data and receive commands.

Receiving unit 40 can be either a portable unit such as a van or a permanent installation. Receiving unit 40 provides further signal analysis of the acoustic signals received from portable field unit 30, and issues commands to portable field unit 30, such as selecting acoustic waveforms to transmit.

Receiving unit 40 can include a separate power supply 44 which can comprise a portable generator either permanently mounted or transportable, with connecting power lines 46. Receiving unit 40 can also transmit data via path 42, which includes radio transmission, telephone lines, or computer data transmission services, including Internet and other service carriers.

Figure 4:
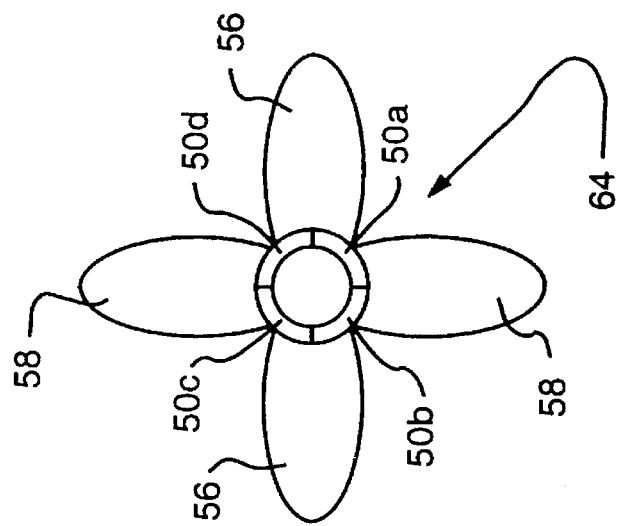
FIG. 4 is a top view of an acoustic receiving element, according to the present invention, showing a dipole signal receiving arrangement.
Figure 3:
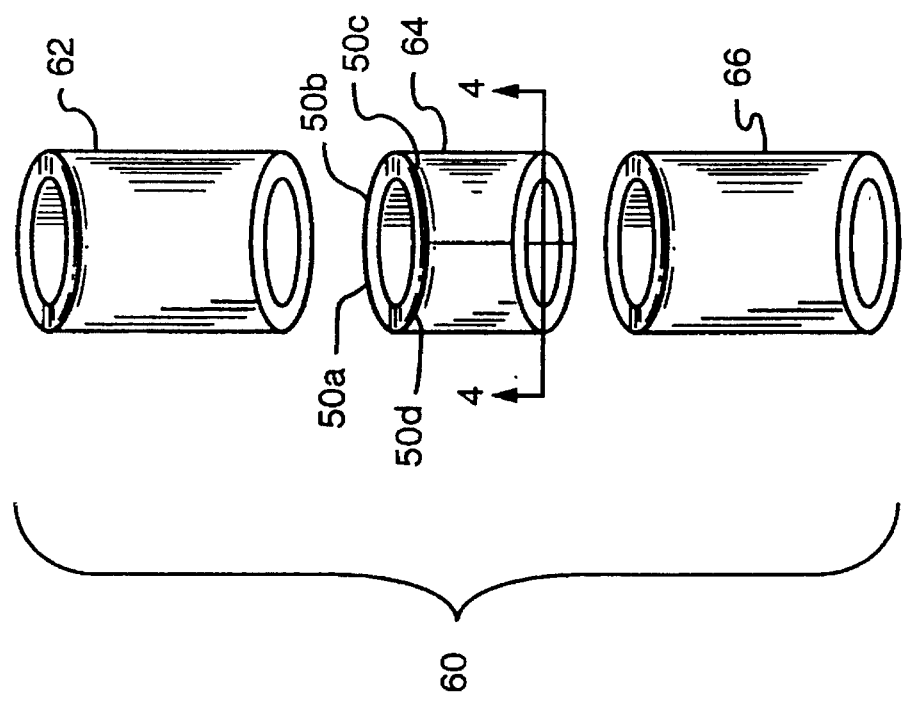
FIG. 3 is a schematic diagram illustrating the acoustic transmitter and receiver element that form the transducer array, according to the present invention.

Transducer array 22, FIG. 2 is composed of 24 feet of cylindrical transducer elements identified generally as 60 and specifically as 60*a*, 60*b*, 60*c*, etc. In the preferred embodiment, transducer array 22 contains 12 separate transducer elements. A single transducer element comprises a transmitting element 62, FIG. 3, located above a receiving element 64 with a second transmitting element 66 located below receiving element 64. Each receiving element 64 consists of a dipole element, FIG. 4, comprising four acoustic elements 50*a*–50*d*, paired as 50*a* with 50*c* and 50*b* and 50*d* to form two dipoles. This produces dipole patterns as shown at 56 and 58 in FIG. 4, which allows the dipole receiving element 64 to determine directionality both to the transmitted signals and the received signals. The dipole receiving element 64 allows the signal processor to determine the angle of arrival of the echoes in the horizontal plane by examining amplitude and phase relationships between the two dipoles 56, 58 of the dipole receiving element 64. By phase comparing of the signals from transmitter element 62 and transmitting element 66, the dipole receiving element 64 can be used to measure the vertical arrival angle of an echo. Transmitting elements 62, 66 can transmit acoustic waves out of phase, or otherwise "tag" or identify their signals so receiving element 64 can distinguish between the corresponding signals.

The system 10 is designed to transmit acoustic signals horizontally into tank 12 at various depths. This allows layers, for example layer 12 which is impenetrable due to trapped gas, to be bypassed. The transducer array 22 can transmit and receive from any or all of the individual transducer elements 60. The system 10 uses phased array sonar processing techniques to produce a stearable acoustic beam, as is known in the art.

The system 10 can insert various acoustic waves into the tank, including Gausian-enveloped frequency modulated slide pulses, which provide high resolution. By measuring the effective shift in the center frequency of the pulses returning by various paths, estimates of the attenuation in the sediment layers can be made. Other acoustic waves which can be used include low frequency long pulses, which are used to establish standing wave patterns within the tank. The frequency of the waves will be dependent on the signals of the tanks and the speed of sound in the master. The power must be sufficient to be detached above the local ambient background noise. This provides data on the structure of solid layers consisting of pockets of material within layers that have characteristic resonances. Analysis of these various signals is well known in the art.

This system 10 allows tanks to be acoustically monitored in real time, even if the tank is in a remote site. Portable field unit 30 can be placed near the tank or further away depending on length of cable 28, and can then transmit data either by microwave 38 over long distances or via cable connection 36 to receiving unit 40 which provides increased signal analysis. It is not necessary to open the tank 12 to measure the content level in the tank, or to determine the actual contents of the tank.

Many modifications of the presently disclosed invention will become apparent to those of skill in the art without departing from the scope of the appended claims.

What is claimed is:

1. A system for imaging contents of a tank comprising: at least one transducer unit including:

at least one acoustic signal transmitting member, for producing at least one acoustic signal; and at least one acoustic signal receiving member, disposed proximate to said at least one acoustic signal transmitting member, said acoustic signal receiving member receiving a reflected said at least one acoustic signal;

a liquid saturated filler material proximate at least a first side of said tank whose contents are being imaged and disposed in acoustic contact with said at least one transducer unit, said liquid saturated filler material allowing said at least one acoustic signal to reach and penetrate said tank whose contents are being imaged; and a transducer unit controller electrically coupled to said at least one transducer unit for controlling said produced at least one acoustic signal and for analyzing said reflected at least one acoustic signal received by said acoustic signal receiving member.

2. The system of claim 1 wherein said at least one transducer unit further comprises a second acoustic signal transmitting member disposed proximate to said at least one acoustic receiving member, said second acoustic transmitting member producing a second acoustic signal, and said at least one acoustic receiving member receives reflected acoustic signals produced by reflection of said at least one acoustic signal and said second acoustic signal.

3. The system of claim 1 further including a plurality of transducer units disposed in a transducer array.

4. The system of claim 1 wherein at least a second transducer unit is disposed generally vertically below said at least one transducer unit.

5. The system of claim 1 wherein said at least one acoustic receiving member comprises at least two acoustic elements joined together to form a dipole.

6. The system of claim 5 further including a plurality of transducer units disposed in a transducer array.

7. The system of claim 6 wherein said at least one acoustic receiving member comprises at least four acoustic elements joined together to form two dipoles to determine the directionality of received acoustic signals.

8. The system of claim 1 wherein said at least one transducer unit comprises ceramic transducers.

9. The system of claim 3 further comprising a fluid filled tube disposed vertically next to said tank, said transducer array being disposed inside said tube and being covered by said fluid.

10. The system of claim 1 wherein said liquid saturated filler material includes dirt saturated with water.

11. The system of claim 1 further comprising a trailer having said transducer array controller positioned thereon.

12. The system of claim 1 further comprising a power supply joined to said transducer array controller.

13. The system of claim 12 wherein said power supply includes batteries.

14. The system of claim 1 wherein said at least one acoustic signal includes Gaussian-enveloped frequency modulated slide pulses.

15. The system of claim 1 wherein said at least one acoustic signal includes low frequency long pulses.

16. A method of acoustically imaging contents of an underground tank including the steps of:

disposing a transducer array proximate at least a first side of said tank whose contents are to be acoustically imaged;

saturating a material generally disposed between the said transducer array and said underground tank whose contents are being acoustically imaged, with water;

producing an acoustic signal from said transducer array;

receiving a reflected acoustic signal at said transducer array said acoustic signal being reflected by contents of said tank; and analyzing said received reflected acoustic signal.

17. The method of claim 16 further comprising the step of providing a fluid filled tube disposed vertically proximate an exterior region of said tank, said transducer array being disposed within said tube.

\* \* \* \* \*